(12) United States Patent
Tanaka (10) Patent No.: US 8,007,112 B2
(45) Date of Patent: Aug. 30, 2011

(54) IMAGE DISPLAY APPARATUS HAVING A PLURALITY OF LIGHT-SHIELDING MEMBERS

(75) Inventor: Hidetomo Tanaka, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 219 days.

(21) Appl. No.: 12/369,985

(22) Filed: Feb. 12, 2009

(65) Prior Publication Data

US 2009/0201468 A1 Aug. 13, 2009

(30) Foreign Application Priority Data

Feb. 12, 2008 (JP) ................................. 2008-030006

(51) Int. Cl.
*G03B 21/00* (2006.01)

(52) U.S. Cl. ................ 353/31; 353/34; 349/10; 349/93; 359/634

(58) Field of Classification Search .................... 353/31, 353/34; 349/10, 93; 359/634
See application file for complete search history.

(56) References Cited

U.S. PATENT DOCUMENTS

| 5,245,449 | A | * | 9/1993 | Ooi et al. | ......................... | 353/31 |
| 5,481,320 | A | * | 1/1996 | Konuma et al. | ............... | 348/751 |
| 6,062,694 | A | * | 5/2000 | Oikawa et al. | .................. | 353/31 |
| 6,227,670 | B1 | * | 5/2001 | Numazaki et al. | .............. | 353/31 |

FOREIGN PATENT DOCUMENTS

JP 11-305674 A 11/1999

* cited by examiner

*Primary Examiner* — Seung C Sohn
(74) *Attorney, Agent, or Firm* — Canon U.S.A. Inc., I.P. Division (57) ABSTRACT

An image display apparatus includes a light source, a color separation unit configured to separate light from the light source into colored light beams, liquid crystal display devices each configured to modulate a corresponding one of the colored light beams in accordance with an image signal, light-shielding members each configured to block light that enters an area outside an effective display area of a corresponding one of the liquid crystal display devices, a color combination unit configured to combine the colored light beams that have been modulated by the liquid crystal display devices, and a projection unit configured to project light produced by combining the colored light beams with the color combination unit, wherein the liquid crystal display devices are fixed to a heatsink, and wherein the light-shielding members each include a base member fixed to the heatsink and a mask member detachably mounted on the base member.

5 Claims, 7 Drawing Sheets

FIG. 9

IMAGE DISPLAY APPARATUS HAVING A PLURALITY OF LIGHT-SHIELDING MEMBERS

BACKGROUND OF THE INVENTION

1. Field of the invention

The present invention relates to an image display apparatus in which liquid crystal display devices are used.

2. Description of the Related Art

In liquid crystal projectors, liquid crystal display devices each corresponding to a light of a particular color are provided. Near the surface of each of the liquid crystal display devices, a light-shielding member is disposed so as to block light from entering the area outside the effective display area of the liquid crystal display device.

Positions of the liquid crystal display devices each of which corresponds to light of a particular color are adjusted with very high accuracy so that pixels of the liquid crystal display devices correspond thereto. However, when the accuracy of positioning a light-shielding frame of the light-shielding member is low relative to the effective display area of the liquid crystal display device, the relative position of the light-shielding frame may become misaligned for light of each color. Accordingly, in the periphery of an image projected on a screen, the light-shielding frame of the light-shielding member is projected to a different position for light of each color. Such an image is recognized as an image in which the colors are smudged.

In an image display apparatus disclosed in Japanese Patent Laid-Open No. 11-305674, a light-shielding member of a liquid crystal display device is fixed with a number of screws to a heatsink. Because the position of the light-shielding member is not adjustable, the accuracy with which the position of the light-shielding member is set relative to the effective display area of the liquid crystal display device may not be sufficient because of an error in manufacturing and assembling the liquid crystal display device or the light-shielding member.

If the light-shielding member is fixed with a simple structure, removing dust that has become stuck to the surface of the liquid crystal display device becomes difficult after the position of the light-shielding member has been adjusted and fixed.

That is, because the surface of the liquid crystal display device is covered with the light-shielding frame of the light-shielding member up to the vicinity of the effective display area, when dust become stuck to the surface of the liquid crystal display device, it is necessary to remove the dust by detaching the light-shielding member. Moreover, it is necessary to readjust the position of the light-shielding member and reassemble the light-shielding member. Therefore, the dust cannot be easily removed.

SUMMARY OF THE INVENTION

According to an aspect of the present invention, a light-shielding member of an image display apparatus is disposed with high accuracy relative to an effective display area of each of a plurality of liquid crystal devices. Therefore, color smudge in the peripheral area of a projection image is prevented. Moreover, dust on the surface of each liquid display device can be removed easily.

According to another aspect of the present invention, an image display apparatus includes a light source, a color separation unit configured to separate light from the light source into a plurality of colored light beams, a plurality of liquid crystal display devices each configured to modulate a corresponding one of the colored light beams in accordance with an image signal, a plurality of light-shielding members each configured to block light that enters an area outside an effective display area of a corresponding one of the liquid crystal display devices, a color combination unit configured to combine the colored light beams that have been modulated by the liquid crystal display devices, and a projection unit configured to project light into which the colored light beams have been combined by the color combination unit.

According to another aspect of the present invention, the liquid crystal display devices are fixed to a heatsink. The light-shielding members each includes a base member fixed to the heatsink and a mask member detachably mounted on the base member.

Further features of the present invention will become apparent from the following description of exemplary embodiments with reference to the attached drawings.

DESCRIPTION OF THE EMBODIMENTS

Figure 1:
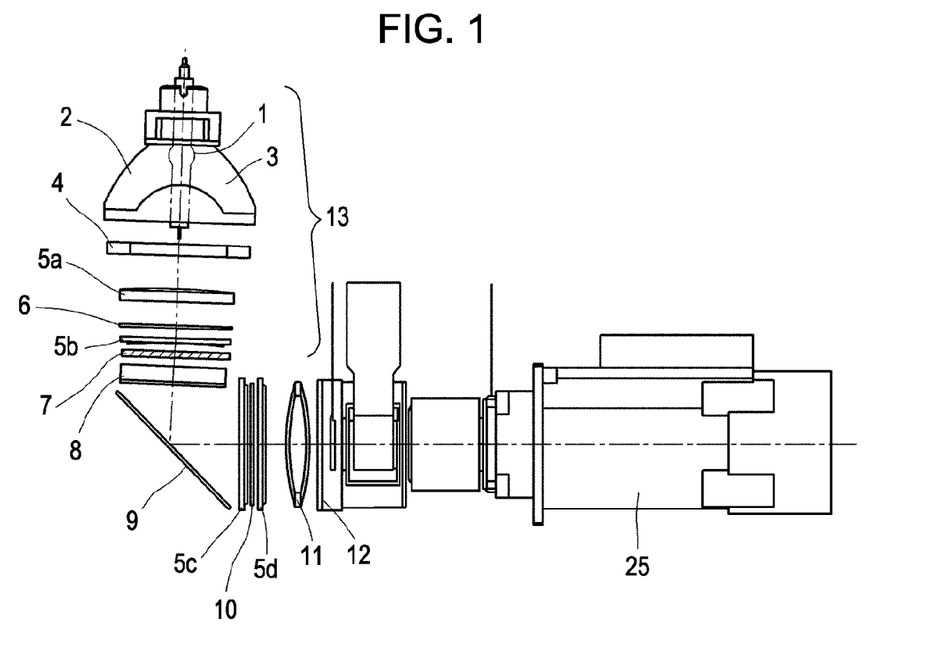
FIG. 1 is a plan view of an optical system of an image display apparatus according to a first embodiment of the present invention.
Figure 2:
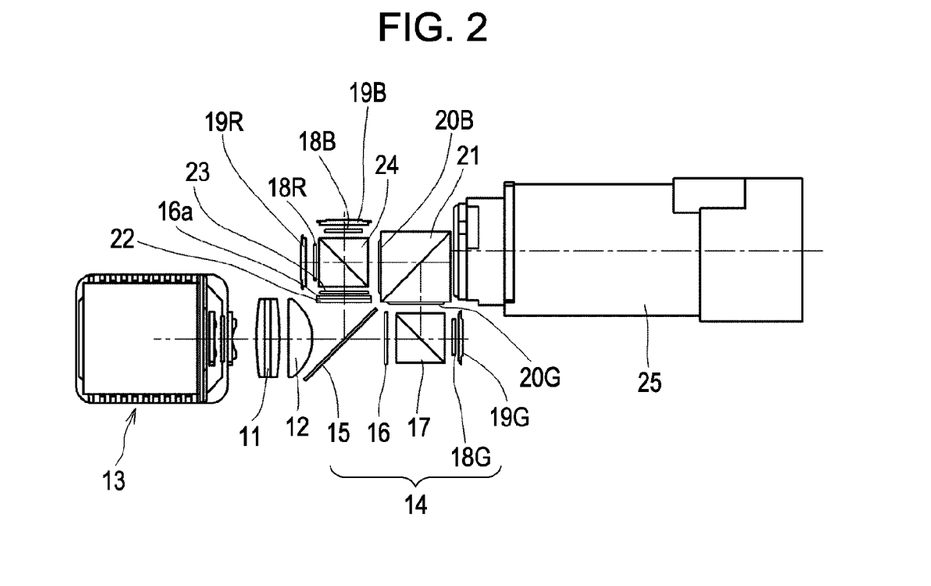
FIG. 2 is a side view of the optical system of the image display apparatus according to the first embodiment of the present invention.

FIG. 1 is plan view, and FIG. 2 is a side view of an optical system of a projector-type image display apparatus according to a first embodiment of the present invention. An arc tube 1 and a reflector 2 constitute a light source lamp 3. In front of the light source lamp 3, an explosion-proof glass 4, a first cylinder array 5a, a UV filter 6, a second cylinder array 5b, a polarization conversion element 7, a front compressor 8, and a total reflection mirror 9 are arranged. In the reflection direction of the total reflection mirror 9, a third cylinder array 5c, a color filter 10, a fourth cylinder array 5d, a condenser lens 11, and a rear compressor 12 are arranged. Such elements from the light source lamp 3 to the rear compressor 12 constitute an illumination optical system 13.

Light exit from the illumination optical system 13 enters a color separation and combination optical system 14, which corresponds to a color separation unit and a color combination unit of the present invention. In the color separation and combination optical system 14, an incident side polarizer 16 for green light, a first polarizing beam splitter 17, a quarter-wave plate 18G, and a reflective liquid crystal display device 19G for green light are disposed in the transmission direction of a dichroic mirror 15. In the reflection direction of the first polarizing beam splitter 17, a dichroic prism 21, to which an exit side polarizer 20G for green light is attached, is disposed. In the reflection direction of the dichroic mirror 15, a trimming filter 22, an incident side polarizer 16a, a color selective retardation plate 23, a second polarizing beam splitter 24, a quarter-wave plate 18B, and a reflective liquid crystal display device 19B are arranged.

In the direction in which the second polarizing beam splitter 24 reflects the light beams entering from the dichroic mirror 15, a quarter-wave plate 18R and a reflective liquid crystal display device 19R for red light are disposed. In the exit side of the second polarizing beam splitter 24, the dichroic prism 21, to which an exit side polarizer 20B for blue light is attached, is disposed. Light that exits the dichroic prism 21 reaches a projection lens barrel 25.

The arc tube 1 emits continuous spectrum white light. The reflector 2 reflects the light from the arc tube 1 in a specified direction. The first cylinder array 5a has a refractive power in the direction perpendicular to the path of light from the light source lamp 3 and perpendicular to the plane of the page. The second cylinder array 5b has a lens array, each lens of which corresponds to a lens in the first cylinder array 5a. The polarization conversion element 7 converts unpolarized light into specified polarized light.

The front compressor 8 is constituted by a cylindrical lens having a refractive power in a direction perpendicular to the light path. The total reflection mirror 9 changes the direction of an optical axis by an angle of 88 degrees. The third cylinder array 5c has a refractive power in a direction perpendicular to the light path from the light source lamp 3, i.e., in a direction perpendicular to the plane of the page. The fourth cylinder array 5d has a lens array, each lens of which corresponds to a lens of the third cylinder array 5c. The color filter 10 returns colored light in a specified wavelength band to the light source lamp 3 so as to adjust color coordinates to specified values. The rear compressor 12 is constituted by a cylindrical lens having a refractive power in a direction perpendicular to the light path.

The dichroic mirror 15 reflects blue light B (wavelength 430-495 nm) and red light R (wavelength 590-650 nm), and transmits green light G (wavelength 505-580 nm). The incident side polarizer 16 for green light, in which a polarizing element is attached to a transparent substrate, transmits p-polarized light only. The first polarizing beam splitter 17 includes a polarization separation surface that transmits p-polarized light and reflects s-polarized light.

An optical image is formed in accordance with an image signal. The reflective liquid crystal display devices 19R, 19G, and 19B modulate light incident on the devices and reflect the light via the respective quarter-wave plates 18R, 18G, and 18B. The trimming filter 22 returns orange light to the light source lamp 3 so as to increase the color purity of red light R. The incident side polarizer 16a for red light R and blue light B, in which a polarizing element is attached to a transparent substrate, transmits p-polarized light only. The color selective retardation plate 23 changes the polarization direction of red light R by an angle of 90 degrees while leaving the polarization direction of blue light B unchanged. The second polarizing beam splitter 24 has a polarization separation surface which transmits p-polarized light and reflects s-polarized light.

The exit side polarizer 20B for blue light transmits only the s-polarized component of blue light B. The exit side polarizer 20G for green light transmits s-polarized light only. The dichroic prism 21 transmits red light R and blue light B while reflecting green light G. Such elements from the dichroic mirror 15 to the dichroic prism 21 constitute the color separation and combination optical system 14.

Note that the terms "p-polarized" and "s-polarized" are used as follows. The polarization conversion element 7 converts p-polarized light to s-polarized light from the viewpoint of the polarization conversion element 7. On the other hand, light that enters the dichroic mirror 15 is said to be p-polarized from the viewpoint of the polarizing beam splitters 17 and 24. So, although light exiting from the polarization conversion element 7 is s-polarized light from the viewpoint of the polarization conversion element 7, this same s-polarized light that enters the dichroic mirror 15 is said to be p-polarized light from the viewpoint of the polarizing beam splitters 17 and 24.

Light emitted from the arc tube 1 is collected in a specified direction by the reflector 2 having a parabolic shape. Light emitted from the focus of a paraboloid becomes light beams parallel to the axis of symmetry of the paraboloid. However, since the arc tube 1 has a finite size is thus not an ideal light source, the collected light beams include many light components that are not parallel to the axis of symmetry of the paraboloid.

The light beams enter the first cylinder array 5a. In the first cylinder array 5a, the light beams are divided and collected into light beams each of which are strip-shaped extending in a direction perpendicular to the light path and corresponding to a cylinder array lens. Moreover, the light beams pass through the UV filter 6 and the second cylinder array 5b so that the light beams each of which are strip-shaped in a direction perpendicular to the light path are formed in the vicinity of the polarization conversion element 7.

The polarization conversion element 7 includes polarization separation surfaces, reflection surfaces, and half-wave plates. Each of the light beams is incident on a corresponding polarization separation surface and divided into a p-polarized component that is transmitted and an s-polarized component that is reflected. The reflected s-polarized component reflects off the reflection surface and exits in the same direction as the p-polarized component. The transmitted p-polarized component passes through the half-wave plate so as to be converted into a component having the same polarization as the s-polarized component, and both components exit the polarization conversion element 7 as light having a uniform polarization direction. The polarization-converted light beams, each of which is strip-shaped in a direction perpendicular to the light path, exit the polarization conversion element 7. Then, the light beams pass through the front compressor 8, reflect off the total reflection mirror 9 at an angle of 88 degrees, and enter the third cylinder array 5c. The light beams which entered the third cylinder array 5c are divided into light beams, each of which is strip-shaped in the horizontal direction in accordance with a cylinder array lens, and collected. The light beams pass through the fourth cylinder array 5d, where the light beams are made into light beams each having a band-shape in the horizontal direction, pass through the condenser lens 11, and reach the rear compressor 12.

Due to optical functions of the front compressor 8, the condenser lens 11, and the rear compressor 12, the light beams provide a rectangular and evenly luminous area in which rectangular images are superposed on top of one another. Reflective liquid crystal display devices 19R, 19G, and 19B, which are described below, are disposed in the luminous area. Next, the light that was converted to s-polarized light by the polarization conversion element 7 enters the dichroic mirror 15.

Green light G, which passed through the dichroic mirror 15, enters the incident side polarizer 16 for green light. The green light G continues to be s-polarized light after being separated by the dichroic mirror 15, when the polarization conversion element 7 is of a p-polarizing type. The green light G exits the incident side polarizer 16 for green light, enters the polarizing beam splitter 17 as p-polarized light, passes through the polarization separation surface, and reaches the reflective liquid crystal display device 19G for green light. The green light G is image-modulated and reflected by the reflective liquid crystal display device 19G for green light. The p-polarized component of the image-modulated and reflected green light G is returned through the polarization separation surface of the first polarizing beam splitter 17 toward the light source lamp 3 so as to be removed from the projection light. On the other hand, the s-polarized component of the image-modulated green light G is reflected by the polarization separation surface of the first polarizing beam splitter 17 and travels toward the dichroic prism 21 so as to be projected.

In a state in which all the polarized components are converted to be p-polarized, i.e., in a state that black is displayed, the slow axis of the quarter-wave plate 18G, which is placed between the first polarizing beam splitter 17 and the reflective liquid crystal display device 19G for green light, is aligned in a specified direction. This alignment serves to reduce the influence of polarization fluctuations generated in the first polarizing beam splitter 17 and the reflective liquid crystal display device 19G for green light. The green light G, which exited the first polarizing beam splitter 17, enters the dichroic prism 21 as s-polarized light. The green light G reflects off the dichroic coating of the dichroic prism 21 and reaches the projection lens barrel 25.

Red light R and blue light B reflected by the dichroic mirror 15 enter the incident side polarizer 16a. The red light R and the blue light B continue to be p-polarized light after being separated by the dichroic mirror 15. The trimming filter 22 filters out orange light from the red light R and the blue light B. Then, the red light R and the blue light B exit the incident side polarizer 16a and enter the color selective retardation plate 23. The color selective retardation plate 23 rotates the polarization direction by an angle of 90 degrees only for red light R. Thus, the red light R as s-polarized light and the blue light B as p-polarized light enter the second polarizing beam splitter 24. The red light R, which entered the second polarizing beam splitter 24 as s-polarized light, is reflected by the polarization separation surface of the second polarizing beam splitter 24 and reaches the reflective liquid crystal display device 19R for red light. The blue light B, which entered the second polarizing beam splitter 24 as p-polarized light, passes through the polarization separation surface of the second polarizing beam splitter 24 and reaches the reflective liquid crystal display device 19B for blue light.

The red light R enters the reflective liquid crystal display device 19R, whereby the red light R is image-modulated and reflected. The s-polarized component of the image-modulated red light R is reflected again by the polarization separation surface of the second polarizing beam splitter 24, returned toward the light source, and removed from the projection light. On the other hand, the p-polarized component of the image-modulated red light R passes through the polarization separation surface of the second polarizing beam splitter 24 and travels toward the dichroic prism 21 so as to be projected.

The blue light B enters the reflective liquid crystal display device 19B, whereby the blue light B is image-modulated and reflected. The p-polarized component of the image-modulated blue light B again passes through the polarization separation surface of the second polarizing beam splitter 24, returned toward the light source lamp 3, and removed from the projection light. On the other hand, the s-polarized component of the image-modulated blue light B is reflected by the polarization separation surface of the second polarizing beam splitter 24 and travels toward the dichroic prism 21 so as to be projected.

By aligning the slow axes of the quarter-wave plates 18R and 18B, which are placed between the second polarizing beam splitter 24 and the reflective liquid crystal display devices 19R and 19B, black displays of the red light R and the blue light B can be adjusted as in the case of the green light G.

The blue light B, which is included in the red light R and blue light B that have been combined into a single light beam and exit from the second polarizing beam splitter 24, is analyzed by the exit side polarizer 20B for blue light and enters the dichroic prism 21. The red light R, while maintaining the p-polarized state, passes through the exit side polarizer 20B for blue light and enters the dichroic prism 21.

Unnecessary components were generated while the blue light B passed through the second polarizing beam splitter 24, reflective liquid crystal display device 19B for blue light, and the quarter-wave plate 18B. When the blue light B is analyzed by the exit side polarizer 20B for blue light, such unnecessary components are removed.

The red light R and the blue light B enter the dichroic prism 21 and pass through the dichroic coating of the dichroic prism 21. Then, the red light R and the blue light B are combined with the green light G reflecting off the dichroic coating and reach the projection lens barrel 25.

The red light R, green light G, and blue light B, which have been combined, are magnified and projected through the projection lens barrel 25 onto a projection surface, such as a screen.

The above-described optical path corresponds to a case when the reflective liquid crystal display devices are in a white display state. In the following, an optical path for a case when the reflective liquid crystal display devices are in a black display state is described. The p-polarized component of the green light G, which passed through the dichroic mirror 15, enters the incident side polarizer 16 for green light and the first polarizing beam splitter 17, passes through the polarization separation surface of the first polarizing beam splitter 17, and reaches the reflective liquid crystal display device 19G for green light. However, since the reflective liquid crystal display device 19G for green light is in a black display state, the green light G is reflected without being image-modulated. For this reason, the green light G continues to be p-polarized after being reflected by the reflective liquid crystal display device 19G for green light. Therefore, the green light G again passes through the polarization separation surface of the first polarizing beam splitter 17, passes through the incident side polarizer 16 for green light, and is returned toward the light source lamp 3 so as to be removed from the projection light.

The p-polarized components of the red light R and the blue light B, which were reflected by the dichroic mirror 15, enter the incident side polarizer 16a, exit the incident side polarizer 16a, and enter the color selective retardation plate 23. The color selective retardation plate 23 has a function to rotate the polarization direction by an angle of 90 degrees for only the red light R. Due to this function, the red light R enters the second polarizing beam splitter 24 as s-polarized light, and the blue light B enters the second polarizing beam splitter 24 as p-polarized light. The red light R, which entered the second polarizing beam splitter 24 as s-polarized light, is reflected by the polarization separation surface of the second polarizing beam splitter 24 and reaches the reflective liquid crystal display device 19R for red light.

The blue light B, which entered the second polarizing beam splitter 24 as p-polarized light, passes through the polarization separation surface of the second polarizing beam splitter 24 and reaches the reflective liquid crystal display device 19B for blue light. Since the reflective liquid crystal display device 19R for red light is in a black display state, the red light R that entered the reflective liquid crystal display device 19R for red light is reflected without being image-modulated. For this reason, the red light R continues to be s-polarized after being reflected by the reflective liquid crystal display device 19R for red light. Therefore, the red light R is reflected again by the polarization separation surface of the first polarizing beam splitter 17, passes through the incident side polarizer 16a, and is returned toward the light source so as to be removed from the projection light and display black.

On the other hand, the blue light B that entered the reflective liquid crystal display device 19B for blue light is reflected without being image-modulated, because the reflective liquid crystal display device 19B for blue light is in a black display state. For this reason, the blue light B continues to be p-polarized after being reflected by the reflective liquid crystal display device 19B for blue light. Therefore, the blue light again passes through the first polarizing beam splitter 17. Then, the blue light is converted to p-polarized light by the color selective retardation plate 23. After passing through the incident side polarizer 16a, the blue light is returned toward the light source lamp 3 so as to be removed from the projection light.

Figure 3:
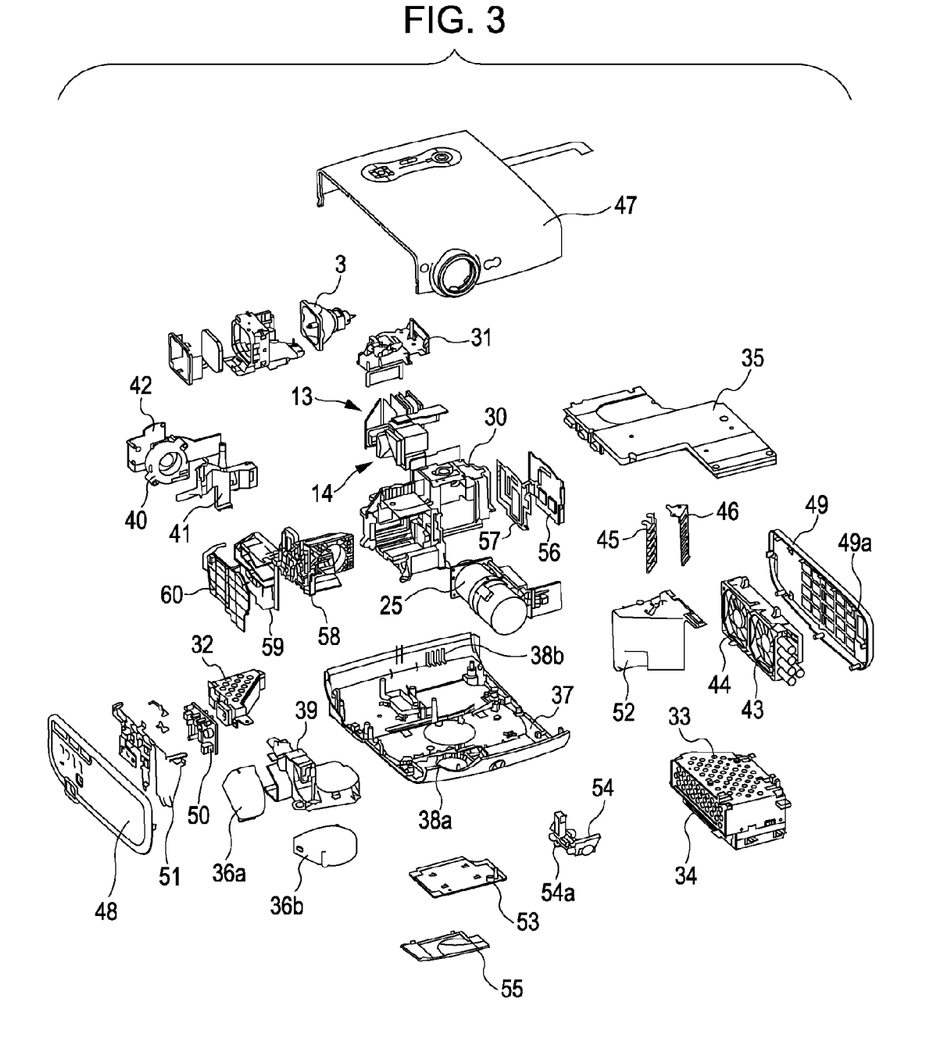
FIG. 3 is an exploded perspective view of the image display apparatus according to the first embodiment of the present invention.

FIG. 3 is an exploded perspective view of the projection-type image display apparatus. Light from the light source lamp 3 travels through the illumination optical system 13. The color separation and combination optical system 14 includes the liquid crystal devices for red light R, green light G, and blue light B, on which the light from the illumination optical system 13 is incident. The light from the color separation and combination optical system 14 enters the projection lens barrel 25, whereby the image is projected onto a screen (not shown). The projection lens barrel 25 contains a projection lens optical system.

An optical box 30 contains the light source lamp 3, the illumination optical system 13, and the color separation and combination optical system 14. The projection lens barrel 25 is fixed to the optical box 30. The optical box 30, containing the illumination optical system 13 and the color separation and combination optical system 14, is covered with a lid 31. A power supply filter 32 and a ballast power supply 33, which are connected to a power supply 34, supply the light source lamp 3 with electric current for lighting the light source lamp 3. A circuit board 35 issues commands for driving the liquid crystal devices and lighting the light source lamp 3 using electric power from the power supply 34. Optical system cooling fans 36a and 36b draw in air through an air intake port 38a of an exterior housing 37 so as to cool optical elements, such as the liquid crystal devices, in the color separation and combination optical system 14. Air drawn in by the optical system cooling fans 36a and 36b is delivered through a duct 39 to the optical elements, such as the liquid crystal devices, in the color separation and combination optical system 14.

A lamp cooling fan 40 blows air to the light source lamp 3 so as to cool the light source lamp 3. A lamp duct 41, while holding the lamp cooling fan 40, serves to deliver the cooling air to the light source lamp 3. A lamp duct 42, which clamps the lamp cooling fan 40, constitutes a duct together with the lamp duct 41. A power supply cooling fan 43 draws in air through an air intake port 38b of the exterior housing 37 so that air circulates inside the power supply 34 and the ballast power supply 33, thereby cooling the power supply 34 and the ballast power supply 33 simultaneously. An exhaust fan 44 discharges air that was blown by the lamp cooling fan 40 and heated by the light source lamp 3 from the exterior housing 37.

Lamp exhaust louvers 45 and 46 have a shielding function whereby light from the light source lamp 3 is not leaked to the outside of the apparatus. The exterior housing 37 contains the optical box 30 and other elements. An exterior housing lid 47 covers the exterior housing 37 containing the optical box 30 and other elements. The exterior housing 37 is closed with side panels 48 and 49. The side panel 49 has an exhaust port 49a. Connectors for receiving various signals are mounted on an interface substrate 50. An interface reinforcing plate 51 is attached to the inner surface of the side panel 48.

A lamp exhaust box 52 serves to transfer heat from the light source lamp 3 to the exhaust fan 44 and prevent exhaust air from spreading inside of the exterior housing 37. The lamp exhaust box 52 holds the lamp exhaust louvers 45 and 46. The lamp lid 53 is screwed onto the bottom surface of the exterior housing 37 in a removable manner. An adjustable foot 54 is attached to the exterior housing 37. The height of a foot portion 54a of the adjustable foot 54 can be adjusted so as to adjust the tilt angle of the main body of the apparatus.

An RGB plate 55 holds a filter (not shown) attached to the outside of the air intake port 38a of the exterior housing 37. An RGB board 56 is disposed in the color separation and combination optical system 14. The RGB board 56 is connected to a flexible printed circuit (FPC) extending from the reflective liquid crystal display devices and is connected to the circuit board 35. An RGB board cover 57 is provided so as to prevent electric noise from entering the RGB board 56.

A prism base 58 holds the color separation and combination optical system 14. A box side cover 59 has a duct-shaped portion that guides cooling air from the optical system cooling fans 36a and 36b so as to cool the optical elements of the color separation and combination optical system 14 and the reflective liquid crystal display devices. An RGB duct 60 forms a duct together with the box side cover 59.

Figure 4:
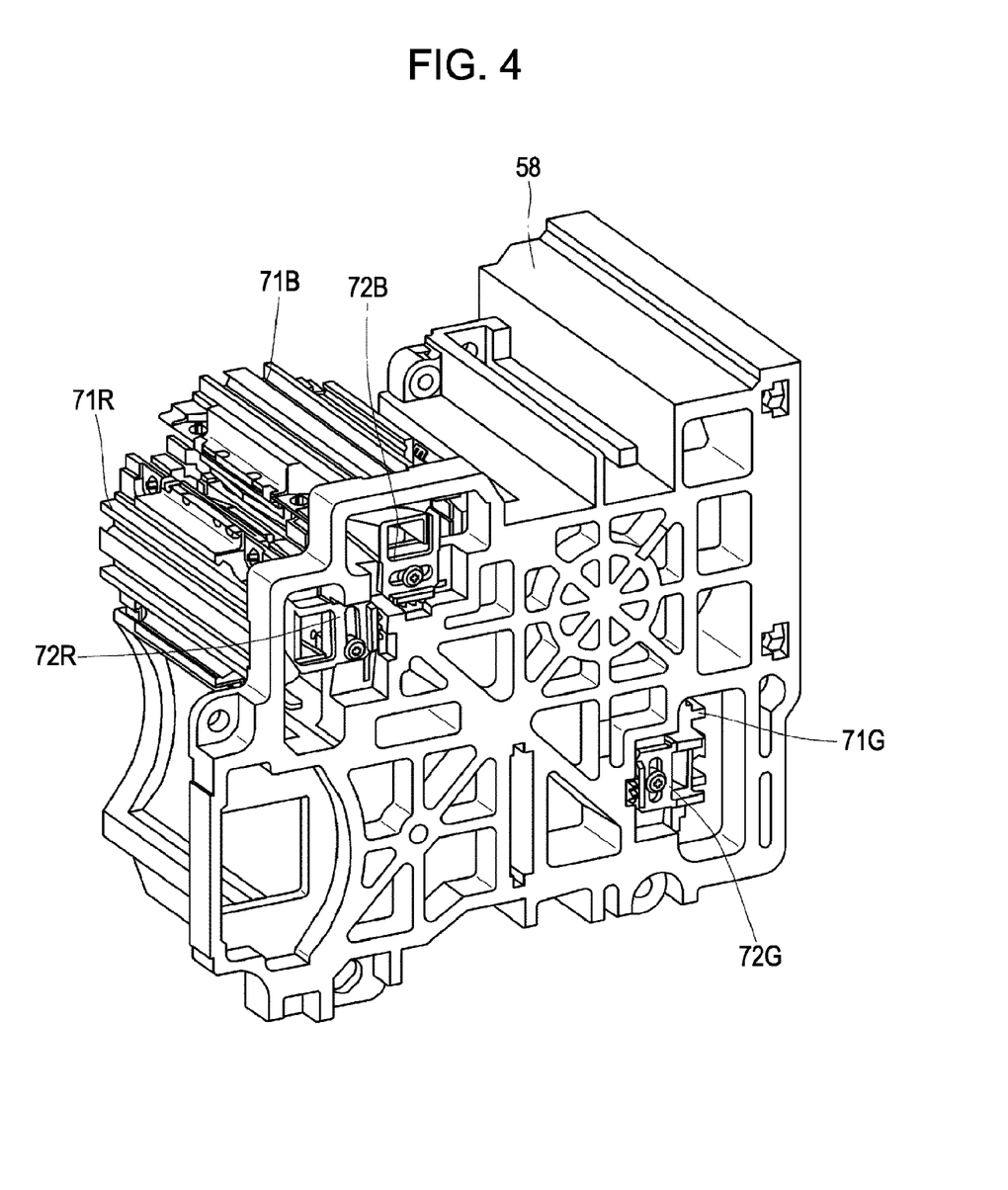
FIG. 4 is a perspective view of a prism base of the image display apparatus according to the first embodiment of the present invention.

FIG. 4 is a perspective view of the prism base 58. The prism base 58 holds the color separation and combination optical system 14. Heatsinks 71R, 71G, and 71B, secured to the prism base 58, hold the reflective liquid crystal display devices 19R, 19G, and 19B, respectively. The heatsinks 71R, 71G, and 71B have structures for dissipating generated heat. Similarly, quarter-wave plate holders 72R, 72G, and 72B hold the quarter-wave plates 18R, 18G, and 18B for RGB light, respectively.

Figure 5:
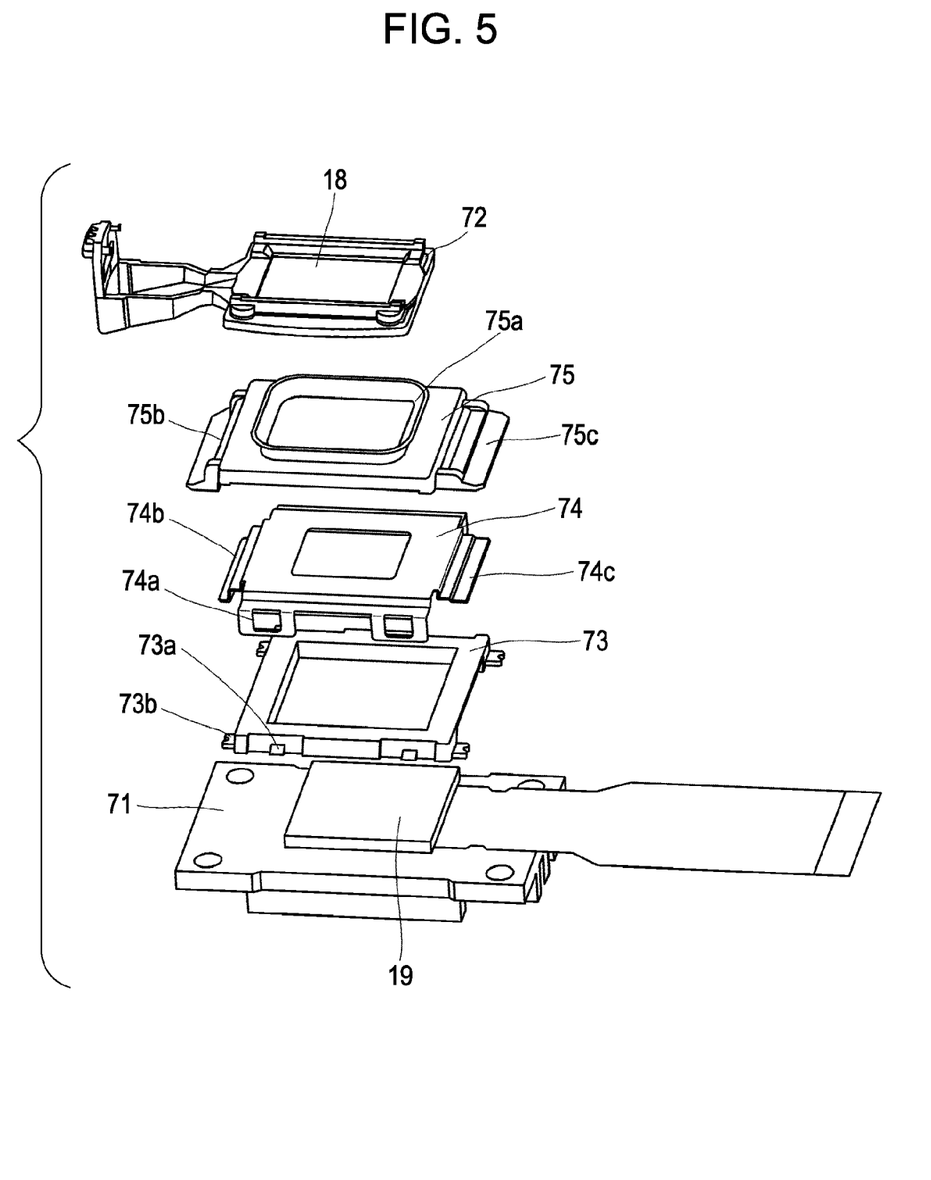
FIG. 5 is an exploded perspective view of an assembly in the image display apparatus of the first embodiment according to the present invention.

FIG. 5 is an exploded perspective view of an assembly including a quarter-wave plate 18, a light-shielding member including a mask base 73 and a panel mask 74, and the reflective liquid crystal display device 19. The structure is the same for red, green, and blue light. The reflective liquid crystal display device 19 is fixed to a heatsink 71. On the heatsink 71, the mask base 73 serving as a base member, the panel mask 74 serving as a mask member, a rubber shield 75, and a quarter-wave plate holder 72, to which the quarter-wave plate 18 is attached, are stacked upon each other. The mask base 73 and the panel mask 74 constitute the light-shielding member. The panel mask 74 shields light so that illuminating light is not incident on the area outside the effective display area of the reflective liquid crystal display device 19.

Figure 6:
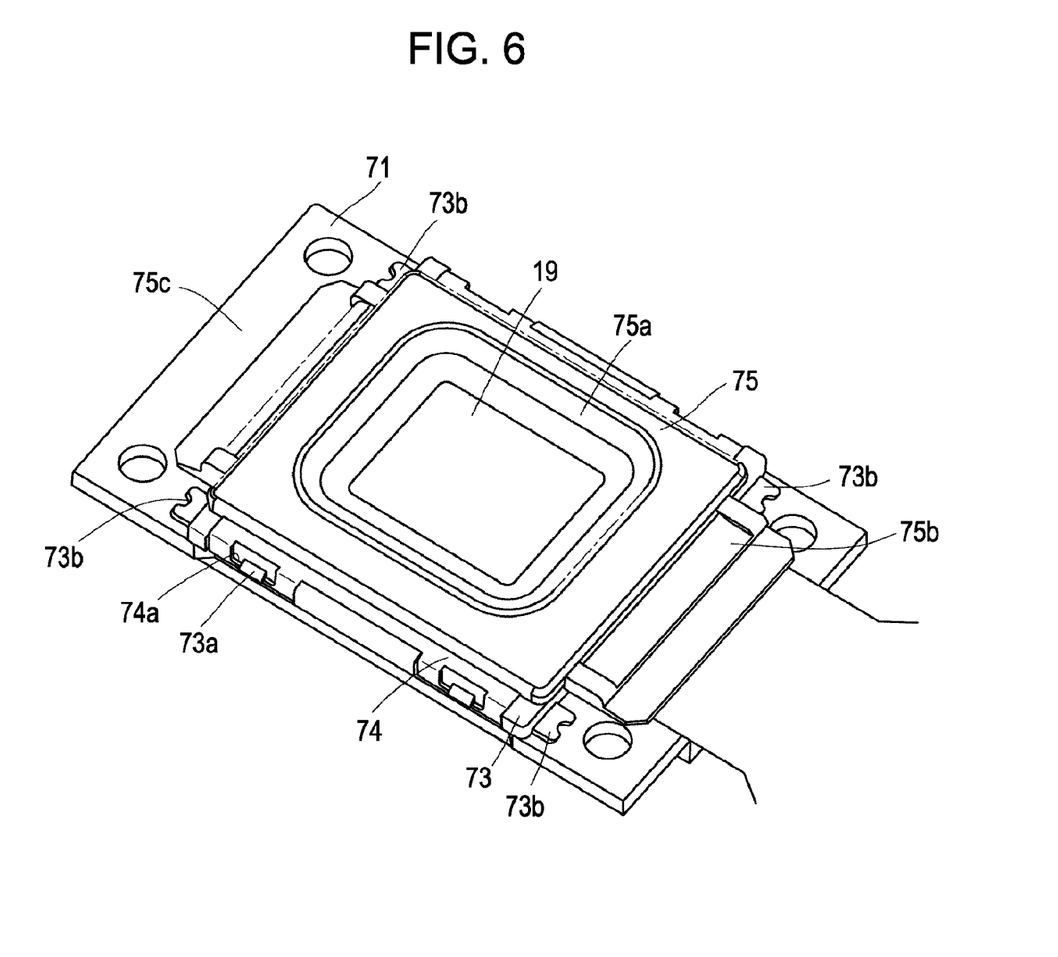
FIG. 6 is a perspective view of the assembly in the image display apparatus according to the first embodiment of the present invention, from which a quarter-wave plate holder is removed.

FIG. 6 is a perspective view of the assembly shown in FIG. 5 in a state in which the elements from the heatsink 71 to the rubber shield 75 are stacked upon each other. The reflective liquid crystal display device 19 is fixed to the heatsink 71. Thermally-conductive silicone is applied between the heatsink 71 and the reflective liquid crystal display device 19 so that heat of the reflective liquid crystal display device 19, which is generated by absorption of light, is effectively dissipated to the heatsink 71.

Lugs 73a on the mask base 73 engage with hooks 74a on the panel mask 74 so as to be fixed. The lugs 73a and the hooks 74a are disposed at four positions along the longitudinal sides. A protrusion at the center of each of the lugs 73a is elastically deformed and put into a recess in the corresponding one of the hooks 74a, thereby serving as a stopper in the direction of the optical axis. Since the panel mask 74 is fixed to the mask base 73 using elastic deformation, the panel mask 74 can be easily detached from the mask base 73.

In this embodiment, the mask base 73 may be made by aluminum die-casting or plastic molding. Alternatively, the mask base 73 may be made of sheet metal or the like.

The mask base 73 is fixed to the heatsink 71 after the position of the mask base 73 is adjusted on the heatsink 71. In order to fix the mask base 73 to the heatsink 71, a UV adhesive is applied to four bonding portions 73b on the mask base 73, the positions of the bonding portions are adjusted, and then the UV adhesive is cured by irradiating the adhesive with UV rays.

The rubber shield 75, which serves as an elastic member, is mounted on the panel mask 74. The rubber shield 75 has a flange portion 75a. A side edge 74b of the panel mask 74 is inserted into a narrow recess in the back side of a side edge 75b of the rubber shield 75. Similarly, a side edge 74c is inserted into a recess in the back side of a side edge 75c. With such insertion on the opposite sides, the rubber shield 75 is held on the panel mask 74.

Since the rubber shield 75 is made of an elastic material such as rubber, the rubber shield 75 is not easily fixed to the panel mask 74 with screws or adhesives. Nevertheless, it is preferable that the component can be removed so that any accumulated dust can be easily cleaned therefrom. The above-described structure may be adopted to promote easy cleaning.

The flange portion 75a of the rubber shield 75 surrounds a space formed by the reflective liquid crystal display device 19 and the quarter-wave plate holder 72, which is an optical element disposed at a side of the light source of the reflective liquid crystal display device 19, and seals the space so as to prevent dust from depositing on the light entry/exit surface of the reflective liquid crystal display device 19.

The quarter-wave plate 18 is attached to a frame-shaped portion of the quarter-wave plate holder 72 and fixed by an adhesive. In order to achieve a high contrast, the quarter-wave plate 18 is disposed with high accuracy and held by the quarter-wave plate holder 72 without looseness. Although an adhesive is used in this embodiment, a plate spring or a screw may be used for fixing.

Since an image on the liquid crystal display device 19 is projected onto the screen, dust on a surface of the reflective liquid crystal display device is particularly conspicuous. In this embodiment, dust on the surface of the liquid crystal display device 19 is the most conspicuous, and dust on the surface of the quarter-wave plate 18 adjacent to the liquid crystal display device 19 is the second most conspicuous. On the other hand, dust on the surface of the quarter-wave plate 18 adjacent to the projection side is less conspicuous, because the light is less focused at the surface.

As described above, dust deposited on the surface of the liquid crystal display device 19, which tends to be conspicuous, is removed. High-pressure air may be blown so as to remove the dust. However, extremely small pieces of dust might not be removed by blowing high-pressure air. For this reason, a method of wiping the surface with silbon paper impregnated with alcohol solvent may be used. Because alcohol solvent often leaves wiping marks, the surface of the liquid crystal display device 19 is preferably wiped with one stroke. At that time, the surface of the liquid crystal display device 19 should be fully exposed.

Figure 7:
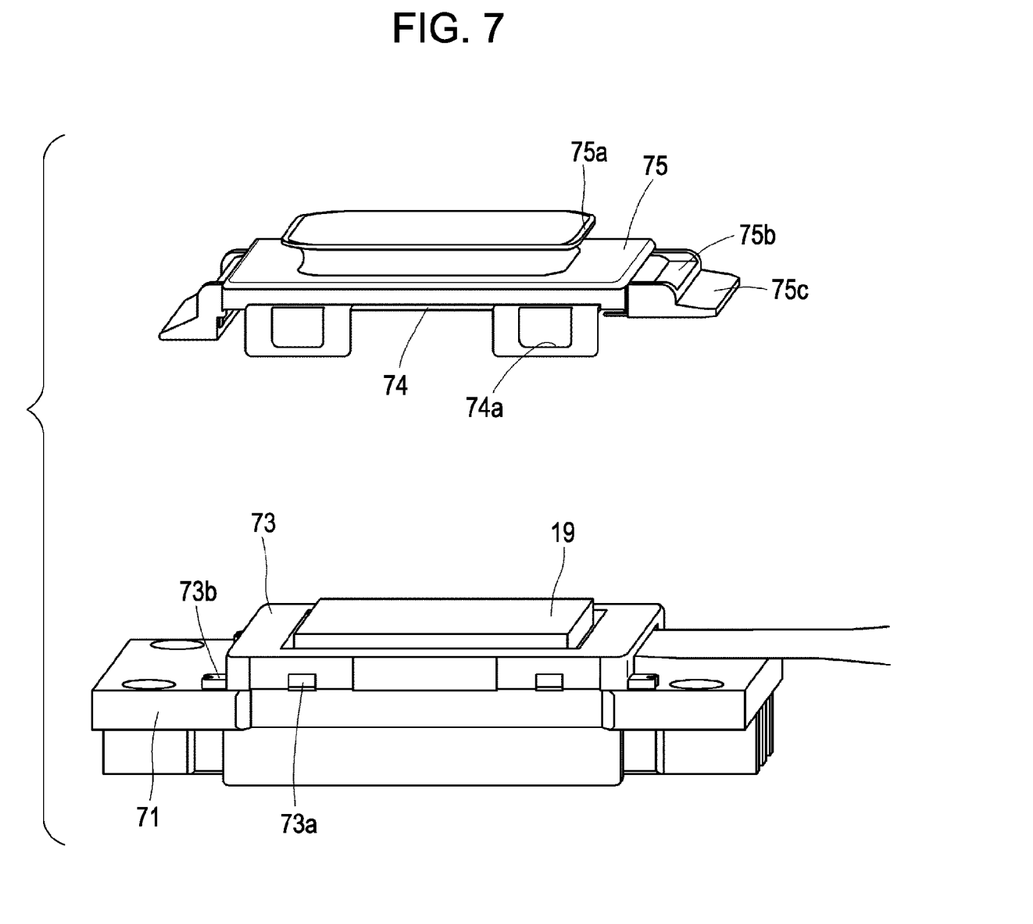
FIG. 7 is a perspective view of the assembly in the image display apparatus according to the first embodiment of the present invention, from which a mask base and a panel mask are removed.

FIG. 7 shows a state when the panel mask 74 is removed from the mask base 73 to allow cleaning of the surface of the liquid crystal display device 19. Because the mask base 73 has an opening larger than the light entry/exit surface of the liquid crystal display device 19, the surface of the liquid crystal display device 19 is fully exposed in the state shown in FIG. 7. Therefore, the surface can be wiped with one stroke with silbon paper and alcohol solvent. After the dust on the surface of the liquid crystal display device is removed, the panel mask 74 is mounted on the mask base 73 as shown in FIG. 6. Then, the rubber shield 75 and the quarter-wave plate holder 72 are stacked upon each other, thereby providing an assembly shown in FIG. 8.

With the structure in which the mask base 73 and the panel mask 74 are detachable, dust deposited on the surface of the liquid crystal display device 19 can be easily removed. Moreover, the position of the mask base 73 is adjusted relative to the effective display area of the liquid crystal display device 19 and the mask base 73 is fixed to the liquid crystal display device 19. Therefore, even when the mask base 73 is detached from the panel mask 74 in order to remove dust deposited on the surface of the liquid crystal display device, the position of the mask base 73 is hardly displaced relative to the effective display area of the liquid crystal display device.

Figure 8:
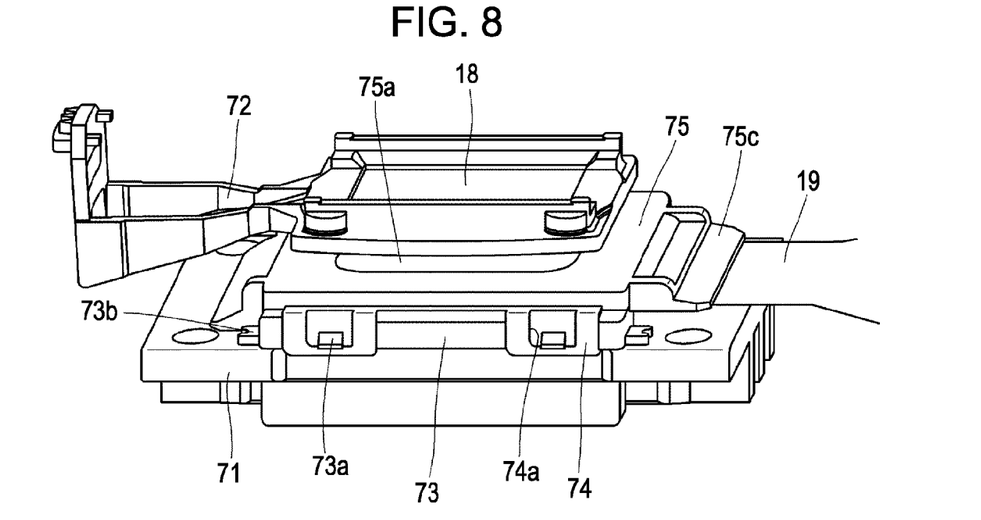
FIG. 8 is a perspective view of an assembled state of the assembly in the image display apparatus according to the first embodiment of the present invention.

In the assembly shown in FIG. 8, the rubber shield 75 blocks dust, thereby providing an excellent dustproofness. In a prism unit shown in FIG. 4, the liquid crystal display device and the light-shielding frame of the panel mask 74 are disposed with high accuracy. Therefore, color smudge in a periphery of the projection image due to a displacement of relative position of the light-shielding frame is reduced, and an excellent image without dust-related deterioration is provided.

Figure 9:
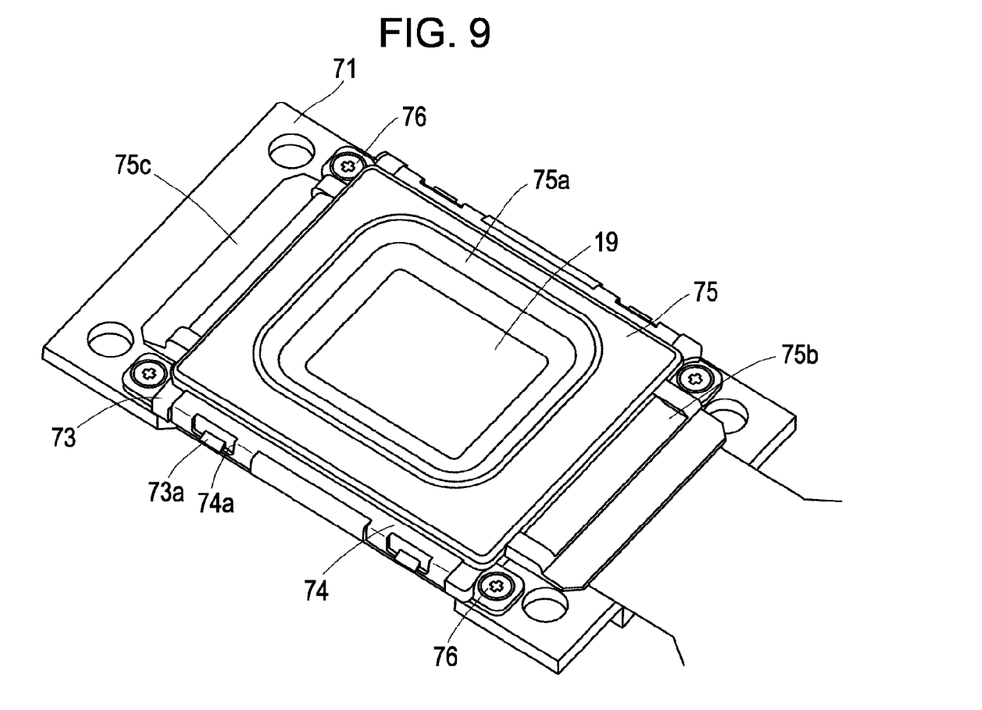
FIG. 9 is perspective view of an assembly in an image display apparatus according to a second embodiment of the present invention, which includes a quarter-wave plate and a liquid crystal display device.

FIG. 9 is a perspective view of a second embodiment. In the first embodiment, the mask base 73 is fixed to the heatsink 71 with a UV adhesive. In the second embodiment, the mask base 73 is fixed to the heatsink 71 is fixed with screws 76.

When the liquid crystal display device 19 is large, the mask base 73 needs to be heavy. Therefore, the position of the mask base 73 may be displaced due to vibration or a drop impact. In such a case, the mask base 73 can be solidly fixed to the heatsink 71 by applying and curing a small amount of UV adhesive for temporary securement and then securing with the screws 76. Washers are preferably used so as to prevent displacement of the panel mask 74 caused when securing the mask base 73 with the screws 76.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-030006 filed Feb. 12, 2008, which is hereby incorporated by reference herein in its entirety.

What is claimed is:

1. An image display apparatus comprising:
a light source;
a color separation unit configured to separate light from the light source into a plurality of colored light beams;
a plurality of liquid crystal display devices each configured to modulate a corresponding one of the colored light beams in accordance with an image signal;
a plurality of light-shielding members each configured to block light that enters an area outside an effective display area of a corresponding one of the liquid crystal display devices;
a color combination unit configured to combine the colored light beams that have been modulated by the liquid crystal display devices; and
a projection unit configured to project light produced by combining the colored light beams with the color combination unit;
wherein the liquid crystal display devices are fixed to a heatsink; and
wherein the light-shielding members each include a base member fixed to the heatsink and a mask member detachably mounted on the base member.

2. The image display apparatus according to claim 1, wherein the base member has an opening larger than a light entry/exit surface of a corresponding one of the liquid crystal display devices.

3. The image display apparatus according to claim 1, wherein the base member and the mask member are detachably joined to each other by engaging a protrusion disposed on one of the base member and the mask member with a recess disposed in the other one of the base member and the mask member.

4. The image display apparatus according to claim 1, further comprising an elastic member configured to surround a space formed by a corresponding one of the liquid crystal display devices and an optical element that is disposed at a side of the light source of the corresponding one of the liquid crystal display devices.

5. The image display apparatus according to claim 4, wherein the elastic member is mounted on the light-shielding member.

* * * * *